(12) United States Patent
Quan

(10) Patent No.: US 7,299,511 B2
(45) Date of Patent: Nov. 27, 2007

(54) STAND UP LAVATORY MODULE

(75) Inventor: William C. Quan, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 40 days.

(21) Appl. No.: 10/834,781

(22) Filed: Apr. 29, 2004

(65) Prior Publication Data

US 2005/0241062 A1  Nov. 3, 2005

(51) Int. Cl.
*E03C 1/01* (2006.01)

(52) U.S. Cl. .............................................. 4/670; 4/664

(58) Field of Classification Search .............. 4/662–64, 4/DIG. 7, 15; 52/34; D23/273–274
See application file for complete search history.

(56) References Cited

U.S. PATENT DOCUMENTS

| | | | | |
|---|---|---|---|---|
| 2,396,992 A | * | 3/1946 | Evans | ............................ 4/663 |
| 3,162,863 A | * | 12/1964 | Wokas | ............................ 52/34 |
| 4,653,125 A | * | 3/1987 | Porter | ............................ 4/301 |
| 4,884,767 A | * | 12/1989 | Shibata | .................... 244/118.5 |
| 6,615,421 B2 | | 9/2003 | Itakura | |

\* cited by examiner

*Primary Examiner*—Charles E. Phillips
(74) *Attorney, Agent, or Firm*—Lee & Hayes, PLLC

(57) ABSTRACT

Lavatory systems that include lavatory modules are provided. In one embodiment, each lavatory module includes a first wall, a second wall coupled to the first wall, a sink, and a urinal. The first wall of a first one of the lavatory modules is attached to the first wall of a second one of the lavatory modules and the first wall of a third one of the lavatory modules is attached to the first wall of a fourth one of the lavatory modules. The second walls are attached to each other. The lavatory modules include an amenities cabinet and a trash bin. The sinks and urinals may be coupled to a common plumbing system. The lavatory modules are manufactured separately and attached once loaded and placed into position on board a vehicle, such as an aircraft.

29 Claims, 7 Drawing Sheets

STAND UP LAVATORY MODULE

FIELD OF THE INVENTION

This invention relates to lavatories and, more specifically, to modular lavatories for providing more efficient use of lavatory space.

BACKGROUND OF THE INVENTION

Current airplane, train, and bus lavatories are typically single, small units that include a commode and a sink. When a passenger uses the lavatory unit, all the amenities of the unit are unavailable for use by another passenger. This can result in people waiting in the aisle for an available lavatory.

In order to reduce waiting times for lavatories, the number of lavatories has been increased. However, installing more lavatories also reduces the available space for passenger seats. This results in a decrease in the ability to generate revenue.

Examples of prior art aircraft lavatories include Japanese Patent Application 03350235 to Futoshi et al., which presents a men's restroom for an aircraft. The men's restroom includes a urinal, a sink, and other amenities. Similarly, in Japanese Patent Application 03350234, Futoshi et al. disclose a single lavatory unit that is combined with a toilet room and a room with a sink. Because this configuration is linear, however, it is not an effective use of space.

Therefore, it would be desirable to provide more access to lavatory facilities with reduced wait times for passengers without adversely impacting revenue generation. However, there is an unmet need to improve the efficiency of and use of space of lavatories.

SUMMARY OF THE INVENTION

The present invention relates to modular lavatory units, and more specifically, to apparatus and methods for providing more efficient use of lavatory space. In one embodiment, a lavatory system includes four lavatory modules. Each lavatory module includes a first wall, a second wall coupled to the first wall, a sink, and a urinal. The first wall of a first one of the lavatory modules is attached to the first wall of a second one of the lavatory modules and the first wall of a third one of the lavatory modules is attached to the first wall of a fourth one of the lavatory modules. The second walls are attached to each other.

In one aspect of the invention, the lavatory modules include an amenities cabinet and a trash bin.

In another aspect of the invention, the sinks and urinals are coupled to a common plumbing system.

In still another aspect of the invention, the lavatory modules are manufactured separately and attached once loaded and placed into position on board a vehicle, such as an aircraft.

The present invention may provide a more efficient use of space allotted to a lavatory unit within a vehicle or other structure, including an aircraft. In some embodiments, the present invention allows for faster cycle time through the lavatories by enabling men to use a separate facility, thereby increasing cycle time at a lavatory unit having a commode. The present invention may also allow more seats to be added to a vehicle, because fewer lavatories may be needed due to the reduced cycle time.

BRIEF DESCRIPTION OF THE DRAWINGS

The preferred and alternate embodiments of the present invention are described in detail below with reference to the following drawings.

DETAILED DESCRIPTION OF THE INVENTION

The present invention relates to apparatus and methods for providing more efficient use of lavatory space. Many specific details of certain embodiments of the invention are set forth in the following description and in FIGS. 1-4 to provide a thorough understanding of such embodiments. One skilled in the art, however, will understand that the present invention may have additional embodiments, or that the present invention may be practiced without several of the details described in the following description.

Figure 1:
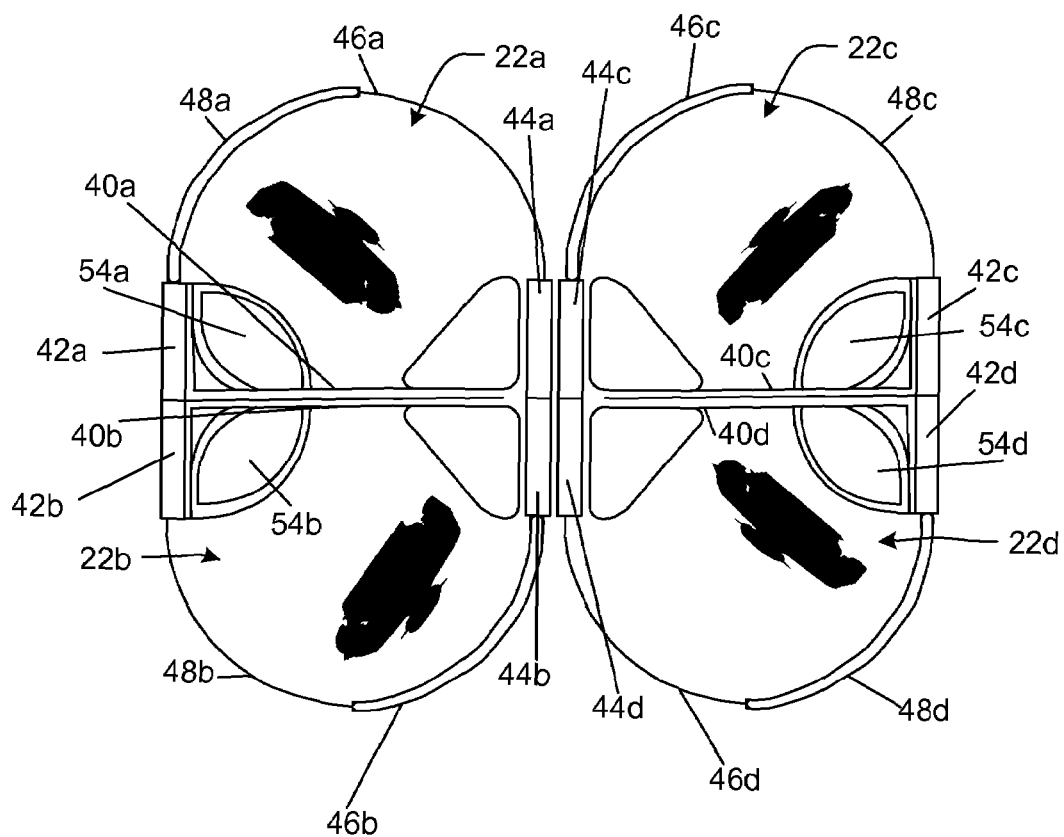
FIG. 1 is a top elevational view of a first embodiment of the present invention.
Figure 2:
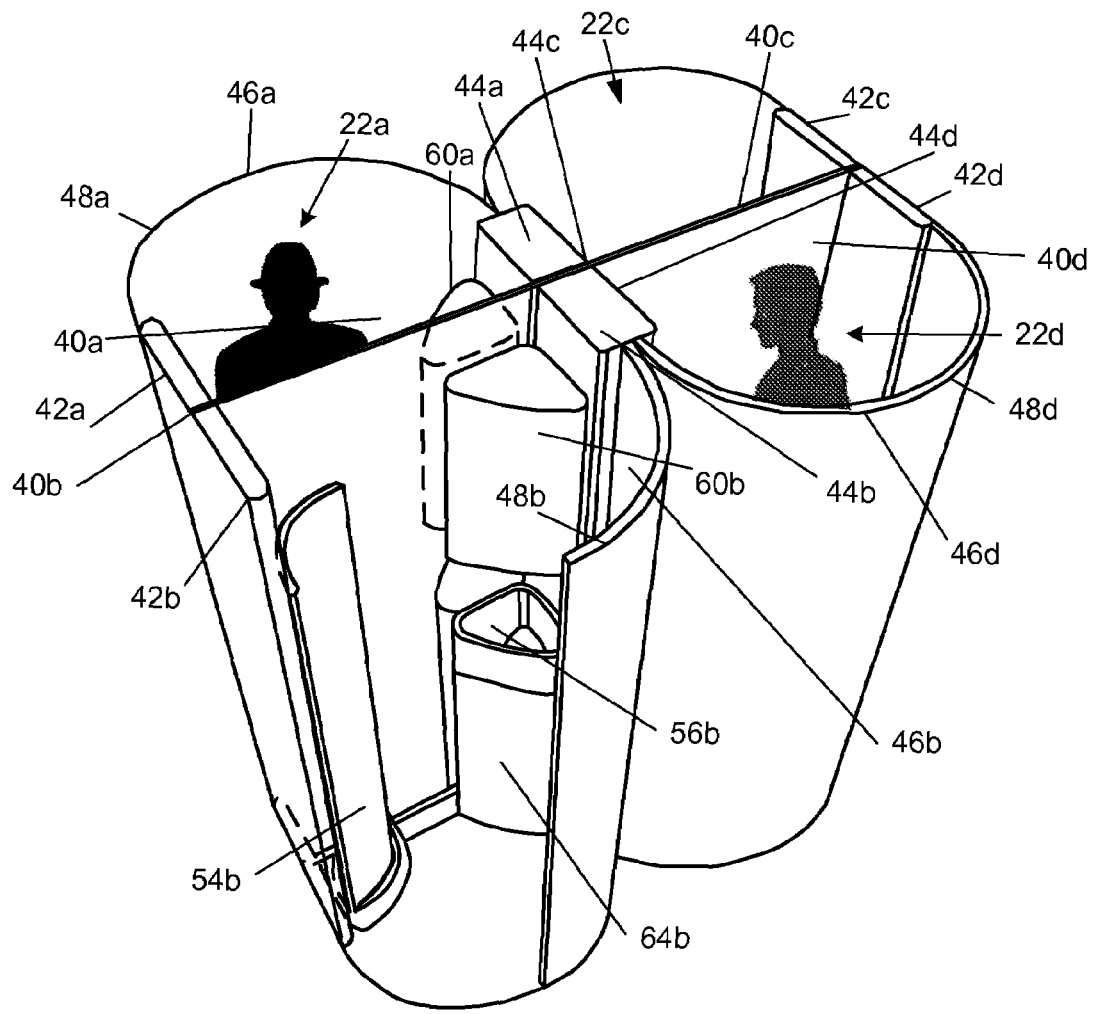
FIG. 2 is a perspective view of the first embodiment of the present invention.

FIGS. 1 and 2 illustrate an embodiment of a group of four urinal lavatory modules 22a-d. Each lavatory module 22a-d includes a first wall 40a-d and second and third walls 42a-d and 44a-d coupled approximately orthogonally to each end of the first wall 40a-d. In one embodiment, the first, second, and third walls 40-44a-d are straight walls. A curved wall 46a-d is attached at a first end to the third wall 44a-d. The curved wall 46a-d slideably receives a curved door 48a-d that is lockable to an unattached end of the second wall 42a-d. The curved door 48a-d allows entry and exit by an occupant. The walls 40, 42, 44, 46 of each lavatory module 22 may be collectively referred to as a housing.

As best shown in FIG. 1, the first and second modules 22a,b are mirror image of each other and are mounted adjacent to each other by placing the first walls 40a,b adjacent to each other. In this embodiment, the third and fourth modules 22c,d are attached to the first and second modules 22a,b by having the third and fourth modules 22c,d being mirror images of the first and second modules 22a,b, respectively, and attaching the first walls 40c,d to each other and attaching the third walls 44c,d to the third walls 44a,b. This configuration allows the modules 22a-d to tap into a single, central common plumbing system.

In one embodiment (FIG. 1), a urinal 54a-d is mounted in an inside module corner as defined by the first and second walls 40a-d and 42a-d. As shown in FIG. 2, a sink 56a-d (one visible) is mounted in a corner defined by the first and third walls 40a-d and 44a-d. Each of the modules 22a-d also includes a towel dispenser and amenities cabinet 60a-d located above the sink 56a-d, and a trash bin cabinet 64a-d located below the sink 56a-d (FIG. 2).

It will be appreciated that other internal configurations of lavatory modules 22a-d may be conceived without departing from the modular aspect of the present invention. For example, the position of the urinals 54 may be exchanged with the position of the sinks 56, and the fourth wall 46 may have other degrees of curvature (or may be straight). Alternately, of course, a wide variety of other desired internal arrangements may be conceived.

It will be appreciated that the lavatory modules 22a-d in accordance with the present invention may have a variety of sizes, shapes, and dimensions, and that the invention is not limited to the particular embodiment shown in FIGS. 1-2. For example, in one particular embodiment, the first wall 40a-d is approximately 38 inches. The curved wall 46a-d and the door 48a-d have a radius of curvature of 36 inches, and the distance between an end of the curved wall 46a-d that is not attached to the third wall 44a-d and the first wall 40a-d is approximately 28½ inches.

Embodiments of lavatory units, in accordance with the present invention, may provide improved utilization of space within a vehicle, such as modern commercial aircraft. The lavatory modules 22a-d may also provide easier construction, and may also reduce the labor and expense associated with redesign of lavatories, because of the modular nature of the lavatory modules 22a-d.

Figure 3:
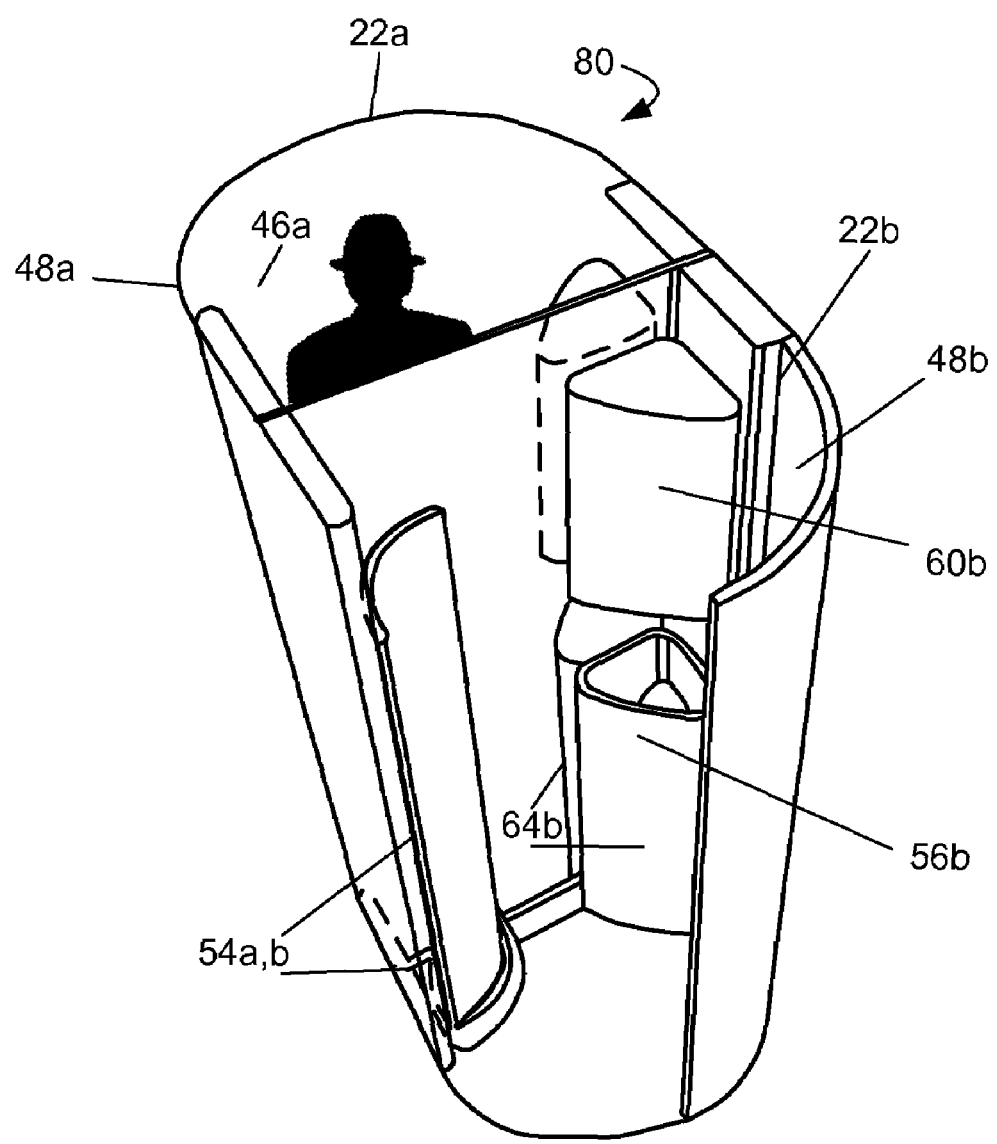
FIG. 3 is a perspective view of the second embodiment of the present invention.

Referring to FIG. 3, in another embodiment, only two lavatory modules 22a and 22b are attached to form a double men's lavatory facility 80. Each of the lavatory modules 22a and 22b in the double lavatory facility 80 are similar to those modules 22a and 22b in the quad lavatory facility 20 shown in FIGS. 1 and 2.

The lavatory modules 22a-d may be used separately without connecting to other modules 22a-d. Thus, the lavatory modules 22a-d may be placed at any variety of places in a vehicle where space is at a premium. Thus, the above-noted advantages of improved utilization of space, reduced cycle times, and improved redesign characteristics may be achieved in alternate embodiments of the invention which may be positioned in less-spacious portions of a vehicle or structure.

The lavatory modules 22a-d may be used separately without connecting to other modules 22a-d. Thus, the lavatory modules 22a-d may be placed at any variety of places in a vehicle where space is at a premium.

Figure 4:
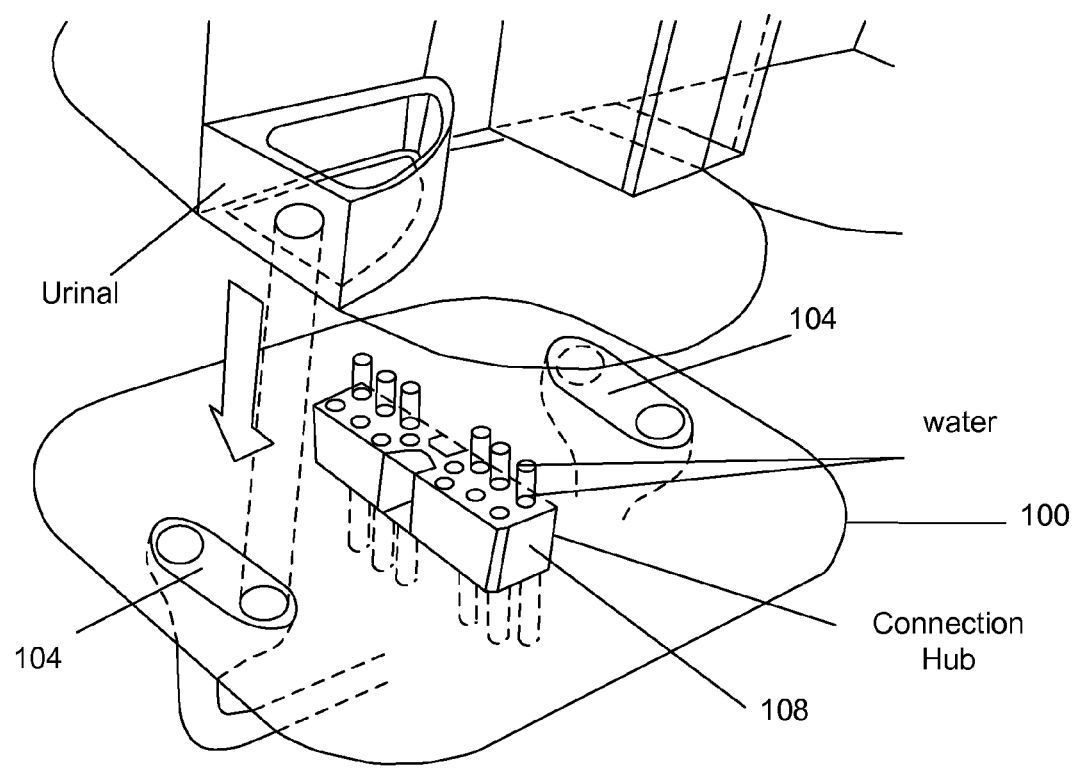
FIG. 4 is an exemplary mounting plate formed in accordance with an embodiment of the present invention.

FIG. 4 illustrates a floor drain plate 100 that receives the four lavatory module configuration as shown in FIGS. 1 and 2. The floor drain plate 100 includes two pairs of common urinal drains 104 and a center connection hub 108. The floor drain plate 100 mounts to the floor of an aircraft cabin and receives or is coupled to the aircraft's sewage, water, and electrical systems. The floor drain plate 100 with the connection hub 108 allows pairs of modules to be slid or dropped into place to allow easy hook-up to faucet lines, sink drains, electrical connections, and urinal drains.

Figure 5:
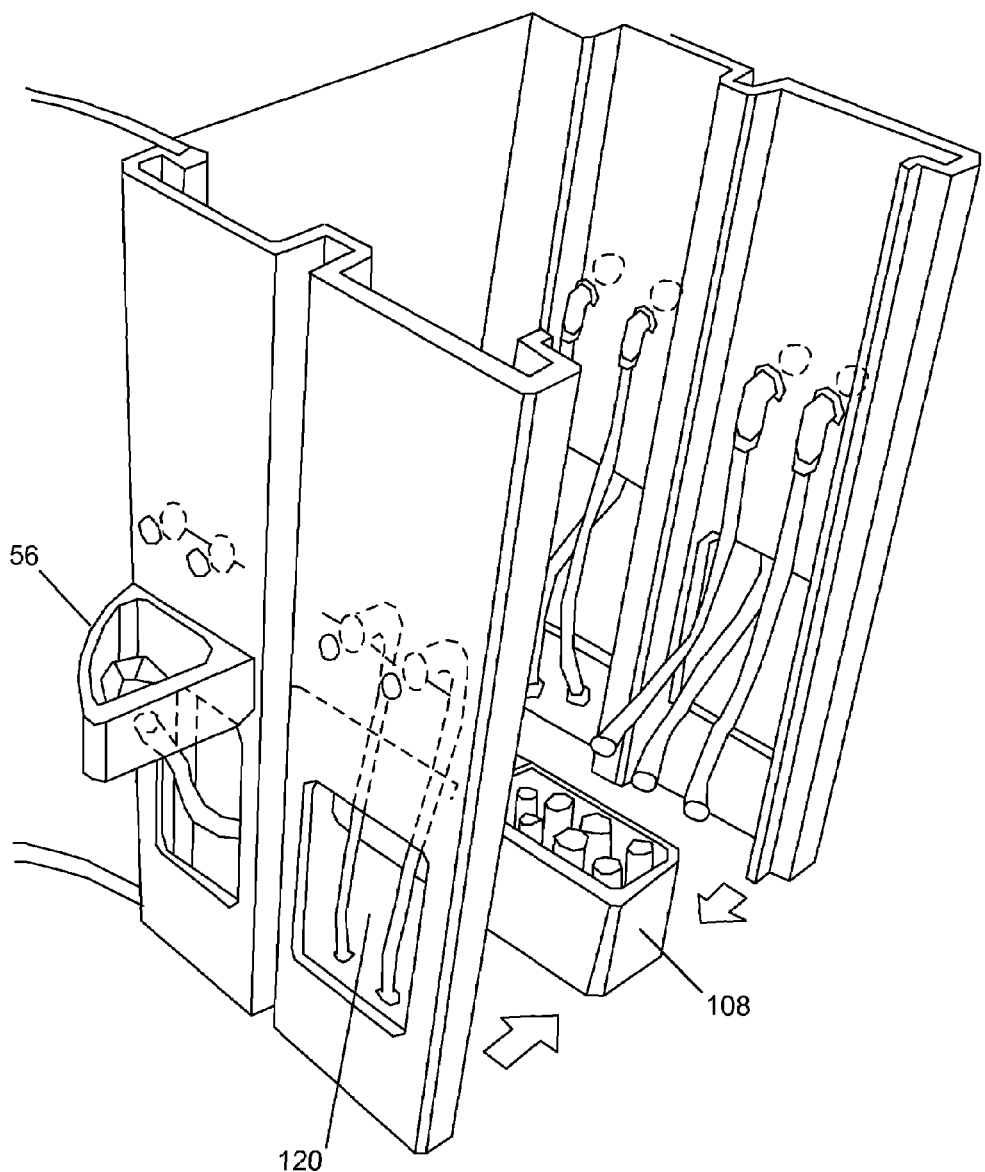
FIG. 5 illustrates exemplary connections of modules with a floor plate of FIG. 4.

FIG. 5 illustrates that the connection hub 108 projects upwardly into a space disposed between the housings of the two lavatory modules, and that each module includes an opening 120 underneath the sink 56 that allows one to easily connect hoses associated with the sink 56 to connect to the corresponding parts within the connection hub 108.

Figure 6:
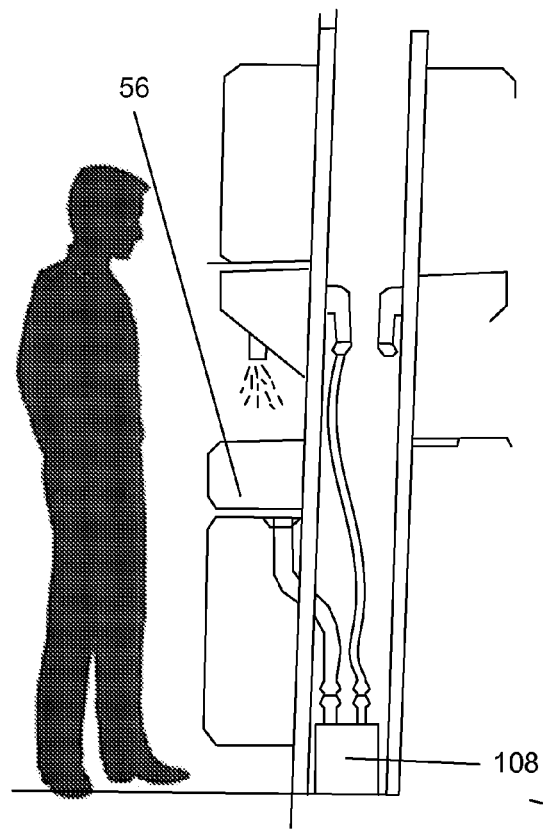
FIG. 6 illustrates a cut-away side view of a module coupled to a floor plate.

FIG. 6 is a cut-away of a portion of a module and the sink lines that are attached to the hub 108.

Figure 7:
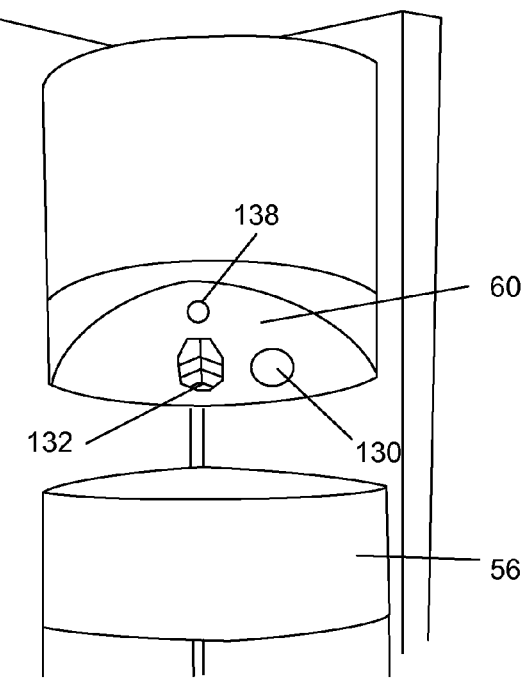
FIG. 7 illustrates an exemplary amenity and faucet cabinet for use in the modules described in FIGS. 1-3.

FIG. 7 illustrates a cabinet 60 that is mounted above the sink 56. The cabinet 60 includes a soap dispenser 130 positioned adjacent to a faucet 132. The faucet 132 connects up to waterlines at the connection hub 108. In one embodiment, a motion sensor 138 is mounted adjacent to the faucet 132 for sensing when a user's hands come within the vicinity of the faucet 132. The motion sensor 138, when sensing approximate motion, activates an electromechanical valve within the faucet 132 thereby providing water to a user.

Furthermore, it will be appreciated that a wide variety of apparatus may be conceived to include lavatory units formed in accordance with alternate embodiments of the present invention, and that the invention is not limited to the particular embodiments described above and shown in FIGS. 1-7. The lavatory modules 22a-d may be used in aircraft with other cabin seat layout designs, in other vehicles (e.g. ships, buses, trains, subways, monorails, etc.), or as stand alone units.

Figure 8:
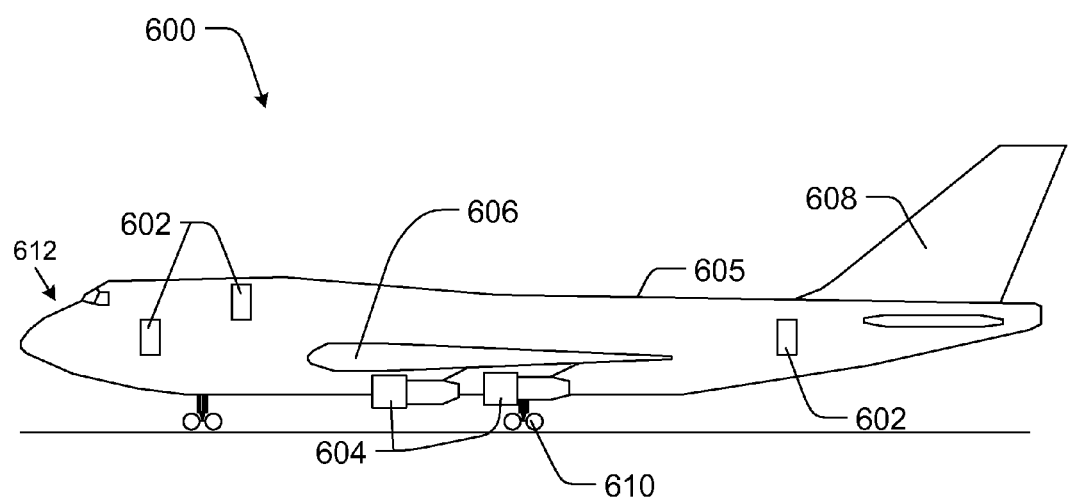
FIG. 8 is a side elevational view of an aircraft with another alternate embodiment of the present invention.

For example, FIG. 8 is a side elevational view of an aircraft 600 having one or more lavatory units 602 formed in accordance with alternate embodiments of the present invention. In general, except for the lavatory units 602 formed in accordance with the present invention, the various components and subsystems of the aircraft 600 may be of known construction and, for the sake of brevity, will not be described in detail herein. Embodiments of lavatory units 602 in accordance with the present invention, including but not limited to those embodiments described above and shown in FIGS. 1-7, may be constructed as a portable unit that is mountable in a vehicle, such as the aircraft 600.

More specifically, as shown in FIG. 8, the aircraft 600 includes one or more propulsion units 604 coupled to a fuselage 605, wing assemblies 606 (or other lifting surfaces), a tail assembly 608, a landing assembly 610, a control system 612 (not visible), and a host of other systems and subsystems that enable proper operation of the aircraft 600. A plurality of lavatory units 602 formed in accordance with the present invention are located within the fuselage 605 and distributed throughout the various portions of the aircraft 600.

Although the aircraft 600 shown in FIG. 8 is generally representative of a commercial passenger aircraft, including, for example, the 737, 747, 757, 767, 777, and 7E7 models commercially-available from The Boeing Company of Chicago, Ill., the inventive apparatus and methods disclosed herein may also be employed in the assembly of virtually any other types of aircraft. More specifically, the teachings of the present invention may be applied to the manufacture and assembly of other passenger aircraft, cargo aircraft, rotary aircraft, and any other types of aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference. It may also be appreciated that alternate embodiments of apparatus and methods in accordance with the present invention may be utilized in the other applications, including, for example, ships, buses, trains, recreational vehicles, subways, monorails, or any other desired application.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A lavatory system, comprising:
   two or more lavatory modules, each lavatory module including:
   a housing having at least one door that is curved in a closed position, wherein the door is configured to enclose a curved section of floor space within the housing when the door is in the closed position;

a sink located within the housing and having a faucet and a drain; and a urinal located within the housing and having an outlet, wherein the housing of one of the lavatory modules is attached to the housing of another of the lavatory modules; and a floor drain assembly including:

a floor plate having two or more apertures disposed therein, each aperture being operatively aligned with a corresponding one of the outlets of the urinals of the two or more lavatory modules and fluidly coupled to a urinal drain; and a connection hub projecting upwardly from the floor plate into a space disposed between the housings of the two or more lavatory modules, the connection hub including at least one supply line operatively coupled to the faucets, and at least one drain line operatively coupled to the drains.

2. The system of claim 1, wherein each housing includes a first wall, the housings being attached along the first walls, and wherein each sink is disposed in a first corner at a first end of the first wall, and each urinal is disposed in a second corner at a second end of the first wall.

3. The system of claim 1, wherein the housing includes a first wall, the first wall of one of the lavatory modules being attached to the first wall of another of the lavatory modules.

4. The system of claim 1, wherein each housing includes a first wall co-extensive with and coupled to a corresponding first wall of an adjacent housing.

5. The system of claim 1, further comprising four lavatory modules.

6. The system of claim 5, wherein the housings of the four lavatory modules include first walls and the first wall of a first one of the lavatory modules is attached to the first wall of a second one of the lavatory modules and the first wall of a third one of the lavatory modules is attachable to the first wall of a fourth one of the lavatory modules.

7. The system of claim 6, wherein the housings include second walls being attached to each other.

8. The system of claim 5, wherein the urinals are coupled to a common plumbing system.

9. The system of claim 1, wherein the connection hub includes an individual supply line coupled to a corresponding one of the faucets, and an individual drain line coupled to a corresponding one of the drains.

10. The system of claim 1, wherein the two or more apertures disposed within the floor plate comprises a pair of apertures that are fluidly coupled to a common drain.

11. A lavatory system, comprising:

four lavatory modules, each lavatory module including:
a first wall;
a second wall coupled to the first wall;
a curved wall;
a curved door configured to be at least partially slideably receivable within the curved wall, wherein the curved door is configured to enclose a curved section of floor space within the lavatory module when the curved door is in a closed position;
a sink; and
a urinal, wherein the first wall of a first one of the lavatory modules is attached to the first wall of a second one of the lavatory modules and the first wall of a third one of the lavatory modules is attached to the first wall of a fourth one of the lavatory modules, and wherein the second walls are attached to each other; and a floor drain assembly including:
a floor plate having two or more apertures disposed therein, each aperture being operatively aligned with a corresponding one of the outlets of the urinals of the two or more lavatory modules and fluidly coupled to a urinal drain; and
a connection hub projecting upwardly from the floor plate into a space disposed between the housings of the two or more lavatory modules, the connection hub including at least one supply line operatively coupled to the faucets, and at least one drain line operatively coupled to the drains.

12. The system of claim 11, wherein the connection hub includes an individual supply line coupled to a corresponding one of the faucets, and an individual drain line coupled to a corresponding one of the drains.

13. The system of claim 11, wherein the first walls of the first and second lavatory modules are co-extensive, and wherein the first walls of the third and fourth lavatory modules are co-extensive.

14. The system of claim 13, wherein the second wall of the first one of the lavatory modules is co-extensive with and coupled to the second wall of the third one of the lavatory modules, and the second wall of the second one of the lavatory modules is co-extensive with and coupled to the second wall of the fourth one of the lavatory modules.

15. The system of claim 11, wherein the sinks and urinals are coupled to a common plumbing system.

16. An aircraft, comprising:
a fuselage;
a propulsion system operatively coupled to the fuselage; and
a floor drain assembly including:
a floor plate having two or more apertures disposed therein, each aperture being operatively aligned with a corresponding one of the outlets of the urinals of the two or more lavatory modules and fluidly coupled to a urinal drain; and
a connection hub projecting upwardly from the floor plate into a space disposed between the housings of the two or more lavatory modules, the connection hub including at least one supply line operatively coupled to the faucets, and at least one drain line operatively coupled to the drains; and
a plurality of lavatory modules, each lavatory module being coupled to at least one adjacent lavatory module and to the floor drain assembly and including:
a first wall;
a second wall coupled to the first wall;
a curved wall;
a curved door configured to be at least partially slidably receivable within the curved wall, wherein the curved door is configured to enclose a curved section of floor space within the lavatory module when the curved door is in a closed position;
a sink; and
a urinal, wherein the first wall of a first one of the lavatory modules is attached to the corresponding first wall of an adjacent one of the lavatory modules.

17. The aircraft of claim 16, wherein the lavatory modules further include at least one of an amenities cabinet, a trash bin, and a sink.

18. The aircraft of claim 16, wherein the plurality of lavatory modules comprises four lavatory modules, each lavatory module being coupled to at least two adjacent lavatory modules, and wherein the second wall of the first one of the lavatory modules is attached to the corresponding second wall of a second adjacent one of the lavatory modules.

19. The aircraft of claim 16, wherein the connection hub includes an individual supply line coupled to a corresponding one of the faucets, and an individual drain line coupled to a corresponding one of the drains.

20. The aircraft of claim 16, wherein the lavatory modules are attached to adjacent lavatory modules once loaded and placed into position within the fuselage of the aircraft.

21. The aircraft of claim 16, wherein the plurality of lavatory modules comprises four lavatory modules, wherein the first wall of a first one of the lavatory modules is co-extensive with and attached to the first wall of a second one of the lavatory modules and the first wall of a third one of the lavatory modules is co-extensive with and attached to the first wall of a fourth one of the lavatory modules.

22. The aircraft of claim 21, wherein the second wall of the first one of the lavatory modules is co-extensive with and coupled to the second wall of the third one of the lavatory modules, and the second wall of the second one of the lavatory modules is co-extensive with and coupled to the second wall of the fourth one of the lavatory modules.

23. A method of providing a lavatory system within a structure, comprising:
   providing a plurality of lavatory modules, each lavatory module including a first wall at least partially enclosing a space and having a urinal and a sink operatively disposed within the space, each urinal having an outlet and each sink having a faucet and a sink drain;
   providing at least one of the lavatory modules with a curved wall configured to at least partially slidably receive a curved door, wherein the curved door is configured to enclose a curved section of floor space within the lavatory module when the curved door is in a closed position;
   providing a floor drain assembly, including:
      a floor plate having two or more apertures disposed therein, each aperture being operatively aligned with a corresponding one of the outlets of the urinals; and
      a connection hub projecting upwardly from the floor plate into a space disposed between the plurality of lavatory modules, the connection hub including at least one supply line and at least one drain line;
   coupling the plurality of lavatory modules to the floor drain assembly, including fluidly coupling the outlets of the urinals with the at least one aperture disposed in the floor plate, coupling the at least one supply line with the faucets, and the at least one drain line with the sink drains;
   positioning the plurality of lavatory modules within the structure;
   coupling the first wall of a first one of the lavatory modules with the first wall of a second one of the lavatory modules, the first walls of the first and second lavatory modules being co-extensive; and
   coupling the plurality of lavatory modules to the structure.

24. The method of claim 23, wherein providing a plurality of lavatory modules includes providing a plurality of lavatory modules having at least one of a sink, a cabinet, and a trash bin.

25. The method of claim 23, wherein providing a plurality of lavatory modules includes providing at least three lavatory modules, each wherein lavatory module includes a second wall, the second wall of the first one of the lavatory modules being co-extensive with and coupled to the second wall of a third one of the lavatory modules.

26. The method of claim 25, wherein providing at least three lavatory modules includes providing four lavatory modules, and wherein the first wall of the third one of the lavatory modules is co-extensive with and coupled to the first wall of a fourth one of the lavatory modules, and wherein the second wall of the second one of the lavatory modules is co-extensive with and coupled to the second wall of the fourth one of the lavatory modules.

27. The method of claim 23, further comprising coupling the floor drain assembly to a plumbing system.

28. The method of claim 23, wherein coupling the first wall of a first one of the lavatory modules with the first wall of a second one of the lavatory modules includes coupling the first walls of the first and second lavatory modules after the first and second lavatory modules are positioned within the structure.

29. The method of claim 23, wherein the structure comprises a portion of an aircraft.

* * * * *